(12) United States Patent
Sim et al.

(10) Patent No.: US 9,541,883 B2
(45) Date of Patent: Jan. 10, 2017

(54) IMAGE FORMING APPARATUS

(71) Applicant: Samsung Electronics Co., Ltd., Suwon-si (KR)

(72) Inventors: Dong-guk Sim, Seoul (KR); Sang-bum Woo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/557,997

(22) Filed: Dec. 2, 2014

(65) Prior Publication Data

US 2015/0362883 A1 Dec. 17, 2015

(30) Foreign Application Priority Data

Jun. 11, 2014 (KR) .......................... 10-2014-0070960

(51) Int. Cl.
*G03G 15/01* (2006.01)
*G03G 15/00* (2006.01)
*F16H 37/08* (2006.01)

(52) U.S. Cl.
CPC ........ *G03G 15/757* (2013.01); *G03G 15/0189* (2013.01); *F16H 37/0806* (2013.01); *G03G 2215/0132* (2013.01)

(58) Field of Classification Search
CPC .................................................. G03G 15/757

USPC ......................................................... 399/167
See application file for complete search history.

(56) References Cited

U.S. PATENT DOCUMENTS 5,828,934 A * 10/1998 Tamura .............. G03G 15/0126
399/228

FOREIGN PATENT DOCUMENTS

JP 2013213559 A * 10/2013

OTHER PUBLICATIONS

Matsuda et al. Translation of JP2013312559. Published Oct. 2013. Translated Mar. 2016.*

* cited by examiner

*Primary Examiner* — Walter L Lindsay, Jr.
*Assistant Examiner* — Philip Marcus T Fadul
(74) *Attorney, Agent, or Firm* — Staas & Halsey LLP

(57) ABSTRACT

An image forming apparatus may include first, second, third, and fourth photosensitive media; a first driving source to rotate the first photosensitive medium; a second driving source to rotate the second photosensitive medium; and a planetary gear train to receive rotational forces of the first and second driving sources so as to rotate the third photosensitive medium, wherein the fourth photosensitive medium is rotated by being linked with the third photosensitive medium.

12 Claims, 13 Drawing Sheets

IMAGE FORMING APPARATUS

CROSS-REFERENCE TO RELATED APPLICATIONS

This application claims priority benefit from Korean Patent Application No. 10-2014-0070960 filed Jun. 11, 2014 in the Korean Intellectual Property Office, the disclosure of which is incorporated herein by reference in its entirety.

BACKGROUND

1. Field

Embodiments relate to an electro-photographic image forming apparatus. More particularly, embodiments relate to an image forming apparatus configured to easily and efficiently drive a plurality of photosensitive drums.

2. Description of the Related Art

Generally, an electro photographic image forming apparatus is an apparatus which prints an image by scanning light onto an image carrier charged by a predetermined potential to form an electrostatic latent image, developing the electrostatic latent image with a predetermined color toner, and then transferring and fixing the developed image onto a print medium.

A color electro photographic image forming apparatus for printing color images includes a plurality of developing units corresponding to a plurality of colors, for example, yellow, magenta, cyan, and black color developing units, and allows images formed by the developing units to be overlapped, thereby forming a full color image.

At this time, color matching, namely, color registration that each of color images developed in the developing units is placed in a right position is essentially required to implement a full-color image.

In order to improve the color registration, two methods are commonly used.

One method is to drive four developing units using a single motor. In this case, photosensitive media of the four developing units are driven by connecting a plurality of gear trains to the single motor. However, because speeds of the four photosensitive media depend on precision of the gear trains, this structure generates a phenomenon in that linear speeds of surfaces of the photosensitive media do not match each other. Accordingly, this method manages the color registration by managing machining tolerances, assembly tolerances, etc. of gears, etc. However, there is a limitation in the management of the color registration.

The other method is that each of the four developing units has an independent driving system and each of the photosensitive media is independently controlled. This method can achieve high color registration so that picture quality is good, but manufacturing cost is expensive.

Accordingly, an image forming apparatus that can improve the color registration and can reduce the manufacturing cost has been required.

SUMMARY

One or more embodiments have been developed in order to overcome the above drawbacks and other problems associated with conventional arrangements. One or more embodiments relate to an image forming apparatus that can improve color registration and can reduce manufacturing cost.

In an aspect of one or more embodiments, there is provided an image forming apparatus which may include first, second, third, and fourth photosensitive media; a first driving source to rotate the first photosensitive medium; a second driving source to rotate the second photosensitive medium; and a planetary gear train to receive rotational forces of the first and second driving sources so as to rotate the third photosensitive medium, wherein the fourth photosensitive medium is rotated by being linked with the third photosensitive medium.

The planetary gear train may include a sun gear; a plurality of planetary gears circumscribed to the sun gear and disposed to rotate along an outer periphery of the sun gear; a ring gear supporting the plurality of planetary gears so that the plurality of planetary gears is inscribed to and rotated along an inner periphery of the ring gear; and a carrier supporting the plurality of planetary gears, wherein the carrier is rotated on a same axis as those of the sun gear and the ring gear.

The rotational force of the first driving source or the second driving source may be input into the ring gear of the planetary gear train, the rotational force of the second driving source or the first driving source may be input into the sun gear of the planetary gear train, and the third photosensitive medium may be rotated by the carrier of the planetary gear train.

Each of the first, second, third, and fourth photosensitive media may include each of first, second, third, and fourth rotation shaft supporting each of the first, second, third, and fourth photosensitive media, and each of first, second, third, and fourth photosensitive medium driving gears coaxially disposed in each of the first, second, third, and fourth rotation shafts.

The first and second photosensitive medium driving gears may receive power from the first and second driving sources, respectively.

In the image forming apparatus, a transmission gear may be disposed in the first rotation shaft of the first photosensitive medium coaxially with the first photosensitive medium driving gear, the transmission gear may transmit power to the ring gear of the planetary gear train, and the sun gear of the planetary gear train may be disposed in the second rotation shaft of the second photosensitive medium coaxially with the second photosensitive medium driving gear.

The third photosensitive medium driving gear of the third photosensitive medium may receive power from the carrier of the planetary gear train.

The fourth photosensitive medium driving gear of the fourth photosensitive medium may receive power from the third photosensitive medium driving gear.

The planetary gear train may be formed of spur gears or helical gears.

According to an aspect of one or more embodiments, there is provided an image forming apparatus which may include first, second, third, and fourth photosensitive media; a first driving source to rotate the first photosensitive medium; a second driving source to rotate the second photosensitive medium; a planetary gear train to receive rotational forces of the first and second driving sources so as to rotate the third photosensitive medium; and a third driving source to rotate the fourth photosensitive medium.

The planetary gear train may include a sun gear; a plurality of planetary gears circumscribed to the sun gear and disposed to rotate along an outer periphery of the sun gear; a ring gear supporting the plurality of planetary gears so that the plurality of planetary gears is inscribed to and rotated along an inner periphery of the ring gear; and a carrier supporting the plurality of planetary gears, wherein the carrier is configured to be rotated on a same axis as those of the sun gear and the ring gear, and wherein the rotational force of the first driving source is transmitted to the ring gear, the rotational force of the second driving source is transmitted to the sun gear, and the third photosensitive medium is rotated by rotational force of the carrier of the planetary gear train.

The planetary gear train may include a first planetary gear train and a second planetary gear train, and each of the first planetary gear train and the second planetary gear train may include a sun gear; a plurality of planetary gears circumscribed to the sun gear and disposed to rotate along an outer periphery of the sun gear; a ring gear supporting the plurality of planetary gears so that the plurality of planetary gears is inscribed to and rotated along an inner periphery of the ring gear; and a carrier supporting the plurality of planetary gears, wherein the carrier is configured to be rotated on a same axis as those of the sun gear and the ring gear.

The rotational force of the first driving source may be transmitted to the ring gear of the first planetary gear train, the rotational force of the second driving source may be transmitted to the sun gear of the first planetary gear train so that the carrier of the first planetary gear train is rotated, and wherein the ring gear of the second planetary gear train receives the rotational force from the carrier of the first planetary gear train, and the sun gear of the second planetary gear train receives the rotational force from the third driving source so that the carrier of the second planetary gear train is rotated, thereby rotating the third photosensitive medium.

According to an aspect of one or more embodiments, there is provided an image forming apparatus which may include first, second, third, and fourth photosensitive media; a first driving source to rotate the first photosensitive medium; a second driving source to rotate the second photosensitive medium; a third driving source to rotate the fourth photosensitive medium; a first planetary gear train to receive rotational forces of the first and second driving sources; and a second planetary gear train to receive rotational force of the third driving source and rotational force of the first planetary gear train so as to rotate the third photosensitive medium.

Each of the first and second planetary gear trains may include a sun gear, a ring gear, a plurality of planetary gears, and a carrier, and wherein the rotational force of the first driving source is input to the ring gear of the first planetary gear train, the rotational force of the second driving source is input to the sun gear of the first planetary gear train, the rotational force of the carrier of the first planetary gear train is input into the ring gear of the second planetary gear train, and the rotational force of the third driving source is input into the sun gear of the second planetary gear train so that the third photosensitive medium is rotated by the carrier of the second planetary gear train.

According to an aspect of one or more embodiments, there is provided an image forming apparatus including a plurality of photosensitive media; and a planetary gear train to receive rotational forces of a first driving source and a second driving source so as to rotate one of the photosensitive mediums, wherein at least one other photosensitive medium is rotated by being linked with the one of the photosensitive mediums.

The planetary gear train may include a sun gear; a plurality of planetary gears circumscribed to the sun gear and disposed to rotate along an outer periphery of the sun gear; a ring gear supporting the plurality of planetary gears so that the plurality of planetary gears is inscribed to and rotated along an inner periphery of the ring gear; and a carrier supporting the plurality of planetary gears, and the carrier is rotated on a same axis as those of the sun gear and the ring gear.

The rotational force of the first driving source or the second driving source may be input into the ring gear of the planetary gear train, the rotational force of the second driving source or the first driving source is input into the sun gear of the planetary gear train, and the one of the photosensitive mediums is rotated by the carrier of the planetary gear train.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
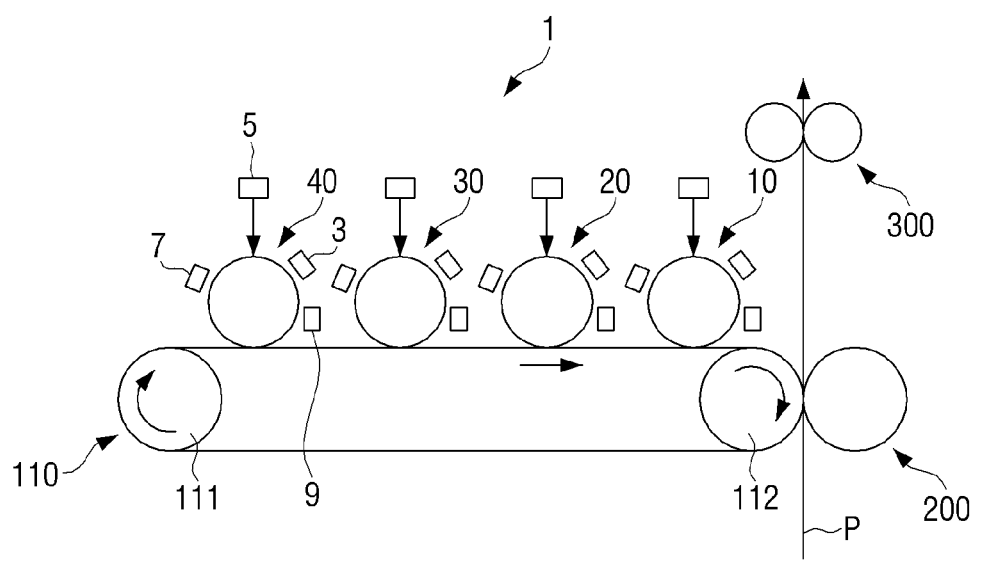
FIG. 1 is a view schematically illustrating configuration of an image forming apparatus according to an embodiment.

Exemplary embodiments will be described with reference to the accompanying drawings. Throughout the drawings, like reference numerals will be understood to refer to like parts, components and structures.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

FIG. 1 is a view schematically illustrating configuration of an image forming apparatus according to an embodiment. For reference, in FIG. 1, components configuring the image forming apparatus, such as a paper feeding unit, an exposure unit, etc., are omitted for simplicity.

Referring to FIG. 1, an image forming apparatus 1 according to an embodiment may include a plurality of photosensitive media 10, 20, 30, and 40, an intermediate transfer belt 110, a transfer roller 200, and a fusing unit 300.

Images corresponding to print data are formed on the plurality of photosensitive media 10, 20, 30, and 40. In an embodiment, four photosensitive media 10, 20, 30, and 40 are used to form full-color images. The four photosensitive media 10, 20, 30, and 40 form a black color image, a cyan color image, a magenta color image, and a yellow color image, respectively. For forming a predetermined image, a charge unit 3, an exposure unit 5, a developing unit (developer) 7, a cleaning member 9, etc. may be disposed around each of the photosensitive media 10, 20, 30, and 40. The charge unit 3 charges a surface of the photosensitive medium 10, 20, 30 or 40 with a predetermined voltage. The exposure unit 5 emits light corresponding to print data to form an electrostatic latent image on the surface of the photosensitive medium 10, 20, 30 or 40. The developing unit 7 supplies developer to the photosensitive medium 10, 20, 30 or 40 to develop the electrostatic latent image into a developer image. The developer images formed on the photosensitive media 10, 20, 30, and 40 are transferred to the intermediate transfer belt 110. The cleaning member 9 removes waste developer remaining on each of the photosensitive media 10, 20, 30, and 40 after the developer image is transferred onto the intermediate transfer belt 110.

The intermediate transfer belt 110 forms a color image by allowing the developer images formed on the plurality of photosensitive media 10, 20, 30, and 40 to be superposedly transferred thereon. The intermediate transfer belt 110 is supported by a pair of rollers 111 and 112, that is, a driving roller and a driven roller to rotate endlessly.

The transfer roller 200 is disposed in a side of the intermediate transfer belt 110, and allows a color image formed on the intermediate transfer belt 110 to be transferred onto a print medium P. When the print medium P supplied from a paper feeding unit (not illustrated) passes through between the transfer roller 200 and the intermediate transfer belt 110, the color image formed on the intermediate transfer belt 110 is transferred onto the print medium P by the transfer roller 200.

The fusing unit 300 allows the transferred color image to be fixed on the print medium P by applying predetermined pressure and heat to the print medium P. The fusing unit 300 may include a pressure roller applying a predetermined pressure to the print medium P and a heat roller to apply a predetermined heat to the print medium P.

The print medium P passed through the fusing unit 300 is discharged outside the image forming apparatus 1.

Various embodiments of a photosensitive medium driving unit to drive a plurality of photosensitive media 10, 20, 30, and 40 usable in the image forming apparatus 1 according to an embodiment as described above will be described. A power transmitting structure of a photosensitive medium driving unit that will be described may be applied to an image forming apparatus having three or more photosensitive media. Although a photosensitive medium driving unit to drive four photosensitive media will be described as one example in the following description, the photosensitive medium driving unit according to an embodiment is not limited thereto.

A power transmitting structure of a photosensitive medium driving unit 101 according to an embodiment will be described with reference to FIGS. 2 to 5.

Figure 2:
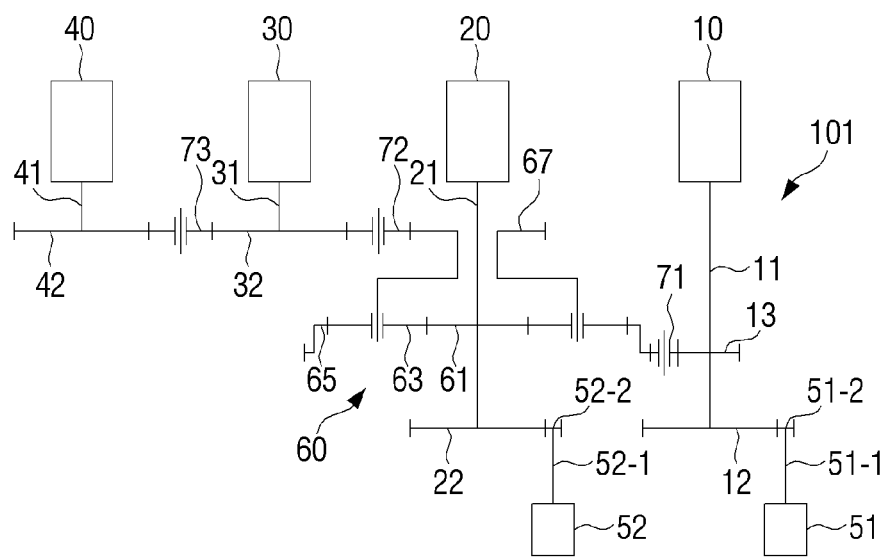
FIG. 2 is a conceptual view illustrating a power transmitting structure of a photosensitive medium driving unit according to a first embodiment usable in an image forming apparatus according to an embodiment.
Figure 3:
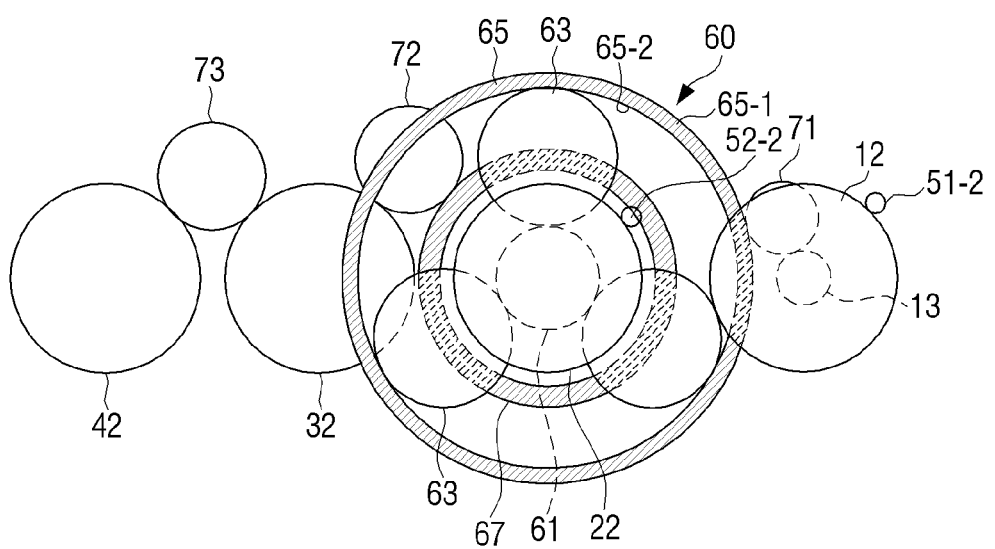
FIG. 3 is a view illustrating connection relationships of gears configuring the power transmitting structure of the photosensitive medium driving unit according to an embodiment of FIG. 2.
Figure 4:
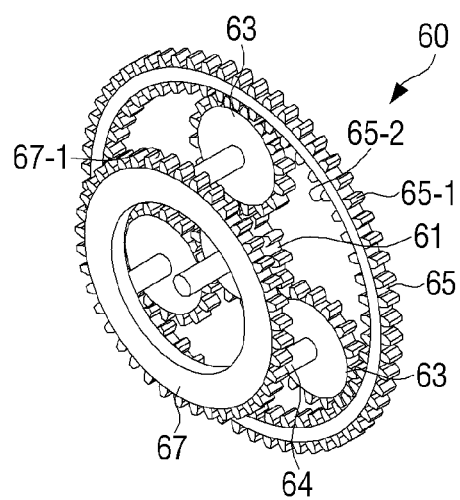
FIG. 4 is a perspective view illustrating a planetary gear train used in a power transmitting structure of a photosensitive medium driving unit according to an embodiment.

FIG. 2 is a conceptual view illustrating a power transmitting structure of a photosensitive medium driving unit according to a first embodiment usable in an image forming apparatus according to an embodiment. FIG. 3 is a view illustrating connection relationships of gears configuring the power transmitting structure of the photosensitive medium driving unit according to an embodiment of FIG. 2. FIG. 4 is a perspective view illustrating a planetary gear train used in a power transmitting structure of a photosensitive medium driving unit according to an embodiment.

Referring to FIGS. 2 and 3, the photosensitive medium driving unit 101 according to a first embodiment may include four photosensitive media 10, 20, 30, and 40, two driving sources 51 and 52, and a planetary gear train 60. For reference, in FIG. 2, the plurality of photosensitive media 10, 20, 30, and 40, the driving sources 51 and 52, and the planetary gear train 60 configuring the photosensitive medium driving unit 101 are conceptually illustrated for convenience of drawing. Also, in FIG. 3, gear teeth of each of the gears are not illustrated for the convenience of drawing.

The four photosensitive media 10, 20, 30, and 40, that is, a first photosensitive medium 10, a second photosensitive medium 20, a third photosensitive medium 30, and a fourth photosensitive medium 40 are rotatably supported by rotation shafts 11, 21, 31, and 41, respectively. Each of photosensitive medium driving gears 12, 22, 32, and 42 is coaxially disposed at one end of each of the rotation shafts 11, 21, 31, and 41. Accordingly, when the photosensitive medium driving gears 12, 22, 32, and 42 are rotated, the photosensitive media 10, 20, 30, and 40 are rotated integrally with the rotation shafts 11, 21, 31, and 41, respectively.

A first photosensitive medium driving gear 12 is disposed at one end of a first rotation shaft 11 of the first photosensitive medium 10 coaxially with the first photosensitive medium 10. A transmission gear 13 is coaxially disposed in the first rotation shaft 11 between the first photosensitive medium 10 and the first photosensitive medium driving gear 12. Accordingly, the first photosensitive medium driving gear 12 is matched with a pinion gear 51-2 of a first driving source 51. The first driving source 51 may be an electric motor. The pinion gear 51-2 is disposed in a shaft 51-1 of the first driving source 51. Therefore, when the shaft 51-1 of the first driving source 51 rotates, the first photosensitive medium driving gear 12 is rotated so that the first photosensitive medium 10 is rotated. At this time, the transmission gear 13 disposed in the first rotation shaft 11 transmits a rotational force to the planetary gear train 60 through a first idle gear 71.

The planetary gear train 60 is configured to receive rotational forces from the two driving sources 51 and 52, and thus to output a synthesized rotational force. The planetary gear train 60, as illustrated in FIG. 4, may include a sun gear 61, a plurality of planetary gears 63, a ring gear 65, and a carrier 67. The plurality of planetary gears 63 are disposed to be circumscribed on and to rotate along the outer periphery of the sun gear 61. In other words, because the plurality of planetary gears 63 rotates along the sun gear 61, each of the plurality of planetary gears 63 rotates on its axis while revolving around the sun gear 61. The ring gear 65 is configured so that the plurality of planetary gears 63 are inscribed on and rotated along the inner periphery of the ring gear 65. Gear teeth of gears 65-2 and 65-1 are formed on the inner periphery and the outer periphery of the ring gear 65. Unlike the ring gear 65 as illustrated in FIG. 4, a ring gear according to another embodiment may be formed in a two-step gear in which an inner ring gear and an outer ring gear are combined with each other. Also, the ring gear 65 is disposed coaxially with the sun gear 61. Accordingly, the plurality of planetary gears 63 rotate around the sun gear 61 while they are circumscribed on the sun gear 61 and inscribed on the ring gear 65.

The carrier 67 is formed to rotatably support the plurality of planetary gears 63, and to rotate on the same axis as that of the sun gear 61 and the ring gear 65. Referring to FIG. 4, in an embodiment, the carrier 67 is formed to support three planetary gears 63. In other words, three planetary gear shafts 64 which rotatably support the three planetary gears 63 are disposed perpendicularly in the carrier 67. Accordingly, when the three planetary gears 63 revolve along the outer periphery of the sun gear 61, the carrier 67 is rotated. Also, outer gear 67-1 has teeth which are formed on the outer periphery of the carrier 67. In FIG. 4, the gear teeth of outer gear 67-1 are formed in a single body with the outer periphery of the carrier 67; however, the carrier 67 may be configured so that a gear formed separately from the carrier 67 is attached to the carrier 67. Gear teeth of each of the sun gear 61, the planetary gears 63, the ring gear 65, and the carrier 67 of the planetary gear train 60 as described above may be formed in spur gear teeth or helical gear teeth.

An outer gear 65-1 of the ring gear 65 of the planetary gear train 60 is matched with the first idle gear 71. Also, the first idle gear 71 is matched with the transmission gear 13 of the first rotation shaft 11. Accordingly, when the first rotation shaft 11 is rotated, the ring gear 65 is rotated by the transmission gear 13 and the first idle gear 71.

The sun gear 61 of the planetary gear train 60 is disposed in a second rotation shaft 21 of the second photosensitive medium 20. A second photosensitive medium driving gear 22 is disposed at one end of the second rotation shaft 21 of the second photosensitive medium 20 coaxially with the second photosensitive medium 20. The sun gear 61 of the planetary gear train 60 is coaxially disposed in the second rotation shaft 21 between the second photosensitive medium 20 and the second photosensitive medium driving gear 22. Accordingly, the second rotation shaft 21 of the second photosensitive medium 20 passes through the center portion of the planetary gear train 60. The second photosensitive medium driving gear 22 is located at one side of the planetary gear train 60, and the second photosensitive medium 20 is located at the other side of the planetary gear train 60, namely, at a side of the carrier 67. A pinion gear 52-2 of a second driving source 52 is matched with the second photosensitive medium driving gear 22. The second driving source 52 may be an electric motor. The pinion gear 52-2 is disposed in a shaft 52-1 of the second driving source 52. Therefore, when the shaft 52-1 of the second driving source 52 rotates, the second photosensitive medium driving gear 22 is rotated so that the second rotation shaft 21 is rotated. When the second rotation shaft 21 is rotated, the sun gear 61 of the planetary gear train 60 disposed in the second rotation shaft 21 is rotated, and the second photosensitive medium 20 is rotated by the second rotation shaft 21 passing through the carrier 67 of the planetary gear train 60.

The carrier 67 of the planetary gear train 60 transmits a rotational force to the third photosensitive medium 30. The third photosensitive medium 30 is disposed to rotate integrally with a third rotation shaft 31. A third photosensitive medium driving gear 32 is coaxially at one end of the third rotation shaft 31. The third photosensitive medium driving gear 32 is connected to the gear 67-1 formed on the outer periphery of the carrier 67 via a second idle gear 72. Accordingly, when the carrier 67 is rotated, the third photosensitive medium driving gear 32 is rotated, and then, when the third photosensitive medium driving gear 32 is rotated, the third rotation shaft 31 is rotated. When the third rotation shaft 31 is rotated, the third photosensitive medium 30 is rotated. In an embodiment, the third photosensitive medium driving gear 32 and the carrier 67 are connected to each other via the second idle gear 72. However, the connection method therebetween is not limited thereto. Alternatively, as long as the third photosensitive medium driving gear 32 is rotated in the same direction as the rotational direction of the carrier 67, the third photosensitive medium driving gear 32 may be connected to the carrier 67 in a variety of ways.

The third photosensitive medium driving gear 32 transmits a rotational force to the fourth photosensitive medium 40. In the same way as the third photosensitive medium 30, the fourth photosensitive medium 40 is disposed to rotate integrally with a fourth rotation shaft 41. A fourth photosensitive medium driving gear 42 is coaxially at one end of a fourth rotation shaft 41. The fourth photosensitive medium driving gear 42 is connected to the third photosensitive medium driving gear 32 via a third idle gear 73. Accordingly, when the third photosensitive medium driving gear 32 is rotated, the fourth photosensitive medium driving gear 42 is rotated, and then, when the fourth photosensitive medium driving gear 42 is rotated, the fourth rotation shaft 41 is rotated. When the fourth rotation shaft 41 is rotated, the fourth photosensitive medium 40 is rotated. In an embodiment, the fourth photosensitive medium driving gear 42 and the third photosensitive medium driving gear 32 are connected to each other via the third idle gear 73. However, the connection method therebetween is not limited thereto. Alternatively, as long as the fourth photosensitive medium driving gear 42 is rotated in the same direction as the rotational direction of the third photosensitive medium driving gear 32, the fourth photosensitive medium driving gear 42 may be connected to the third photosensitive medium driving gear 32 in a variety of ways.

Figure 5:
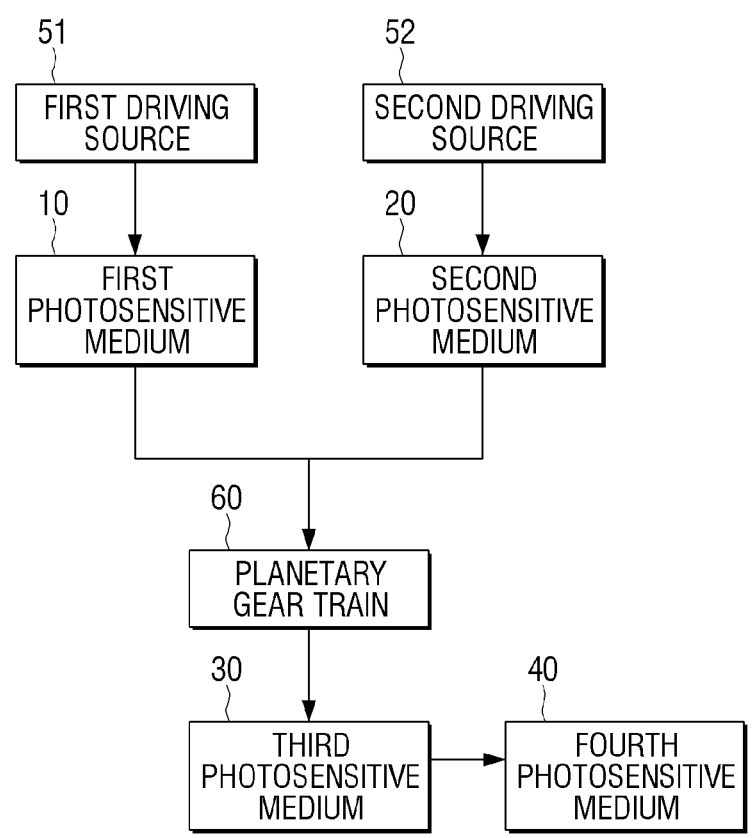
FIG. 5 is a block diagram illustrating power flow in a power transmitting structure of a photosensitive medium driving unit according to an embodiment.

The photosensitive medium driving unit 101 according to an embodiment having the structure as described above has a power flow as illustrated in FIG. 5. FIG. 5 is a block diagram illustrating a power flow in a power transmitting structure of a photosensitive medium driving unit according to an embodiment.

Referring to FIG. 5, the power of the first driving source 51 is transmitted to the first photosensitive medium 10, and the power of the second driving source 52 is transmitted to the second photosensitive medium 20. Also, the powers of the first and second driving sources 51 and 52 are synthesized by the planetary gear train 60, and thus transmitted to the third photosensitive medium 30. The power transmitted to the third photosensitive medium 30 is again transmitted to the fourth photosensitive medium 40. In other words, the photosensitive medium driving unit 101 according to an embodiment rotates the four photosensitive media 10, 20, 30, and 40 using two driving sources 51 and 52. At this time, the first and second photosensitive media 10 and 20 are directly driven by the two driving sources 51 and 52, namely, the first and second driving sources 51 and 52, and the third and fourth photosensitive media 30 and 40 are driven by the planetary gear train 60.

Operation of the photosensitive medium driving unit 101 according to an embodiment will be described with reference to FIGS. 2 and 3.

If the first driving source 51 rotates, the first photosensitive medium driving gear 12 is rotated via the pinion gear 51-2. When the first photosensitive medium driving gear 12 is rotated, the first rotation shaft 11 is rotated so that the transmission gear 13 and the first photosensitive medium 10 are rotated integrally with the first rotation shaft 11. When the transmission gear 13 is rotated, the ring gear 65 of the planetary gear train 60 is rotated.

When the second driving source 52 rotates, the second photosensitive medium driving gear 22 is rotated through the pinion gear 52-2. When the second photosensitive medium driving gear 22 is rotated, the second rotation shaft 21 is rotated so that the sun gear 61 of the planetary gear train 60 and the second photosensitive medium 20 are rotated integrally with the second rotation shaft 21. When the ring gear 65 and the sun gear 61 are rotated by the first and second driving sources 51 and 52, the three planetary gears 63 matched with the sun gear 61 are rotated. When the three planetary gears 63 are rotated, the carrier 67 is rotated.

When the carrier 67 of the planetary gear train 60 is rotated, the second idle gear 72 matched with the carrier 67 are rotated. When the second idle gear 72 is rotated, the third photosensitive medium driving gear 32 matched with the second idle gear 72 is rotated. When the third photosensitive medium driving gear 32 is rotated, the third photosensitive medium 30 coaxially disposed in the third rotation shaft 31 is rotated integrally by the third rotation shaft 31.

Further, when the third photosensitive medium driving gear 32 is rotated, the third idle gear 73 matched with the third photosensitive medium driving gear 32 also is rotated. When the third idle gear 73 is rotated, the fourth photosensitive medium driving gear 42 matched with the third idle gear 73 is rotated. When the fourth photosensitive medium driving gear 42 is rotated, the fourth photosensitive medium 40 coaxially disposed in the fourth rotation shaft 41 is rotated integrally by the fourth rotation shaft 41.

Accordingly, when the first and second driving sources 51 and 52 rotate, the first, second, third, and fourth photosensitive media 10, 20, 30, and 40 are rotated in the same direction. Therefore, a yellow color image, a cyan color image, a magenta color image, and a black color image formed on the surfaces of the first, second, third, and fourth photosensitive media 10, 20, 30, and 40 are sequentially transferred onto the intermediate transfer belt 110 so as to form a color image.

In an embodiment, because the ring gear 65 of the planetary gear train 60 is rotated by the rotational force of the first driving source 51 and the sun gear 61 of the planetary gear train 60 is rotated by the rotational force of the second driving source 52, a synthesized rotational force generated by synthesizing the rotational forces of the first driving source 51 and the second driving source 52 is output through the carrier 67. Accordingly, a rotational speed of the carrier 67 of the planetary gear train 60 may be a value between the rotational speed of the sun gear 61 and the rotational speed of the ring gear 65.

For example, the rotational speed of the carrier 67 of the planetary gear train 60 may be calculated by a following formula.

$$\omega_3 = \frac{Z_1}{Z_1 + Z_2}\omega_1 + \frac{Z_2}{Z_1 + Z_2}\omega_2$$

Here, $\omega_1$ is the rotational speed of the ring gear 65, $Z_1$ is the number of teeth of the inner gear 65-2 of the ring gear 65, $\omega_2$ is the rotational speed of the sun gear 61, $Z_2$ is the number of teeth of the sun gear 61, and $\omega_3$ is the rotational speed of the carrier 67. Here, the rotational speed of each of the ring gear 65, sun gear 61, and carrier 67 may be represented as an angular speed.

For example, if the number $Z_1$ of teeth of the inner gear 65-2 of the ring gear 65 is 66 and the number $Z_2$ of the sun gear 61 is 33, the above formula may be expressed as the following formula.

$$\omega_3 = \frac{66}{66+33}\omega_1 + \frac{33}{66+33}\omega_2 = \frac{2}{3}\omega_1 + \frac{1}{3}\omega_2$$

From the above-formula, it can be seen that the rotational speed $\omega_3$ of the carrier 67 becomes a value between the rotational speed $\omega_1$ of the ring gear 65 and the rotational speed $\omega_2$ of the sun gear 61.

Also, because the rotational speed of the ring gear 65 is determined by the rotational speed of the first photosensitive medium 10 and the rotational speed of the sun gear 61 is determined by the rotational speed of the second photosensitive medium 20, it can be seen that the rotational speed of the carrier 67 is determined as a value between the rotational speed of the first photosensitive medium 10 and the rotational speed of the second photosensitive medium 20. Accordingly, the third photosensitive medium 30 and the fourth photosensitive medium 40 rotated by the carrier 67 are rotated at a rotational speed of a value between the rotational speed of the first photosensitive medium 10 and the rotational speed of the second photosensitive medium 20.

For example, for forming a color image in the image forming apparatus 1, the first driving source 51 and the second driving source 52 may be controlled to rotate at the same rotational speed. However, there may be a slight difference between the rotational speed of the first photosensitive medium 10 and the rotational speed of the second photosensitive medium 20 due to machining and assembly errors existing between a mechanical connection between the pinion gear 51-2 of the first driving source 51 and the first photosensitive medium driving gear 12 and a mechanical connection between the pinion gear 52-2 of the second driving source 52 and the second photosensitive medium driving gear 22. If there is a slight difference in the rotational speed between the first photosensitive medium 10 and the second photosensitive medium 20, the carrier 67 of the planetary gear train 60 is rotated with a value between the rotational speed of the first photosensitive medium 10 and the rotational speed of the second photosensitive medium 20. As a result, even if a separate controller is not used, the third photosensitive medium 30 and the fourth photosensitive medium 40 are rotated at a rotational speed having a value between the rotational speed of the first photosensitive medium 10 and the rotational speed of the second photosensitive medium 20. Therefore, in the image forming apparatus 1 according to an embodiment, the color registration can be improved.

A power transmitting structure of a photosensitive medium driving unit 102 according to an embodiment will be described with reference to FIGS. 6 and 7.

Figure 6:
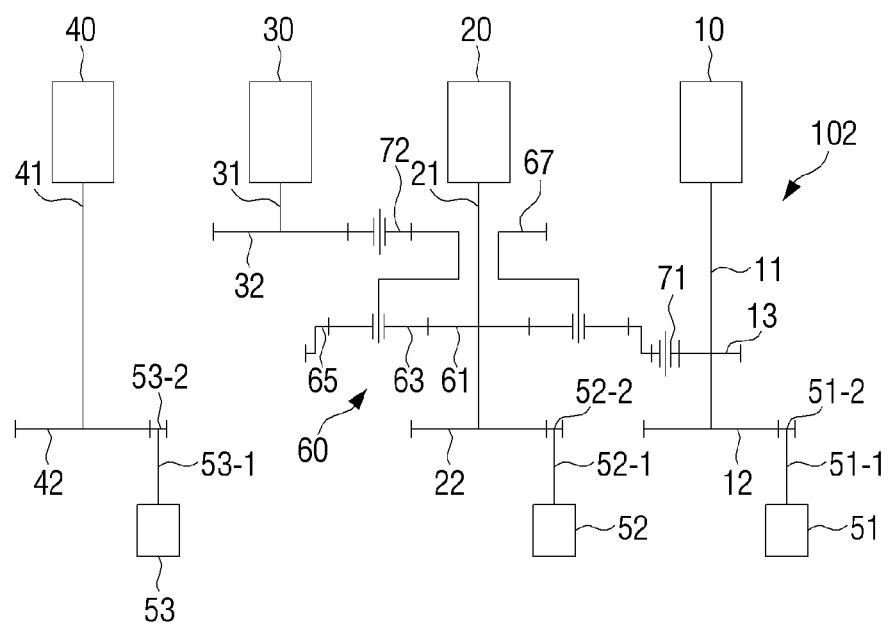
FIG. 6 is a conceptual view illustrating a power transmitting structure of a photosensitive medium driving unit according to a second embodiment usable in an image forming apparatus according to an embodiment.
Figure 7:
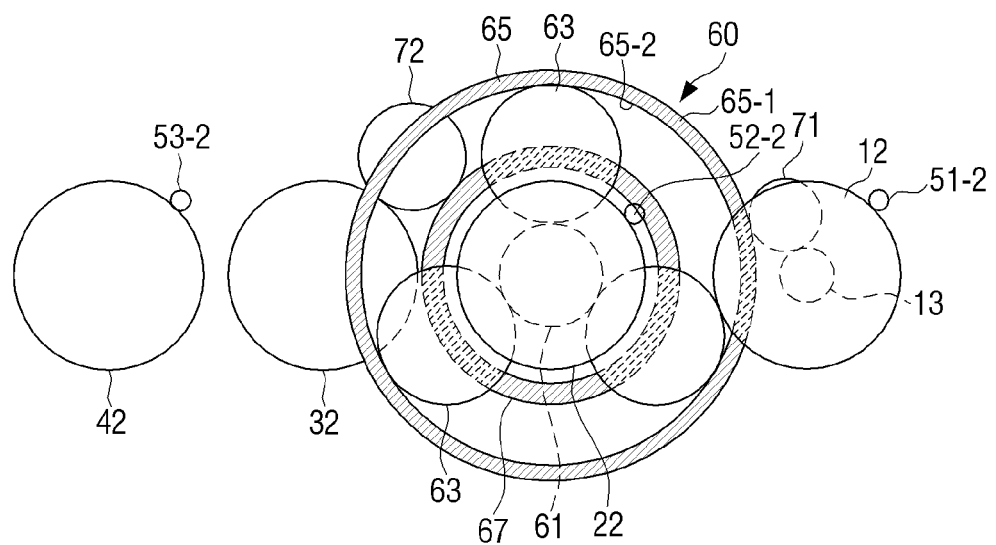
FIG. 7 is a view illustrating connection relationships of gears configuring the power transmitting structure of the photosensitive medium driving unit according to an embodiment.

FIG. 6 is a conceptual view illustrating a power transmitting structure of a photosensitive medium driving unit according to an embodiment usable in an image forming apparatus according to an embodiment, and FIG. 7 is a view illustrating connection relationships of gears configuring the power transmitting structure of the photosensitive medium driving unit according to an embodiment of FIG. 6.

Referring to FIG. 6, the photosensitive medium driving unit 102 according to an embodiment may include four photosensitive media 10, 20, 30, and 40, three driving sources 51, 52, and 53, and a planetary gear train 60. For reference, in FIG. 6, the plurality of photosensitive media 10, 20, 30, and 40, the driving sources 51, 52, and 53, and the planetary gear train 60 configuring the photosensitive medium driving unit 102 are conceptually illustrated for convenience of drawing. Also, in FIG. 7, gear teeth of each of the gears are not illustrated for the convenience of drawing.

The four photosensitive media 10, 20, 30, and 40, that is, a first photosensitive medium 10, a second photosensitive medium 20, a third photosensitive medium 30, and a fourth photosensitive medium 40 are rotatably supported by rotation shafts 11, 21, 31, and 41, respectively. Each of photosensitive medium driving gears 12, 22, 32, and 42 is coaxially disposed at one end of each of the rotation shafts 11, 21, 31, and 41. Accordingly, when the photosensitive medium driving gears 12, 22, 32, and 42 are rotated, the photosensitive media 10, 20, 30, and 40 are rotated integrally with the rotation shafts 11, 21, 31, and 41, respectively.

A first photosensitive medium driving gear 12 is disposed at one end of a first rotation shaft 11 of the first photosensitive medium 10 coaxially with the first photosensitive medium 10. A transmission gear 13 is coaxially disposed in the first rotation shaft 11 between the first photosensitive medium 10 and the first photosensitive medium driving gear 12. Accordingly, the first photosensitive medium driving gear 12 is matched with a pinion gear 51-2 of a first driving source 51. The first driving source 51 may be an electric motor. The pinion gear 51-2 is disposed in a shaft 51-1 of the first driving source 51. Therefore, when the shaft 51-1 of the first driving source 51 rotates, the first photosensitive medium driving gear 12 is rotated so that the first photosensitive medium 10 is rotated. At this time, the transmission gear 13 disposed in the first rotation shaft 11 transmits a rotational force to the planetary gear train 60 through a first idle gear 71.

The planetary gear train 60 is configured to receive rotational forces from the two driving sources 51 and 52, and thus to output one synthesized rotational force. The planetary gear train 60 may include a sun gear 61, a plurality of planetary gears 63, a ring gear 65, and a carrier 67. The planetary gear train 60 is the same as the planetary gear train 60 of the photosensitive medium driving unit 101 according to the first embodiment as described above; therefore, a detailed description thereof is omitted.

An outer gear 65-1 of the ring gear 65 of the planetary gear train 60 is matched with the first idle gear 71. Also, the first idle gear 71 is matched with the transmission gear 13 of the first rotation shaft 11. Accordingly, when the first rotation shaft 11 is rotated by the first driving source 51, the ring gear 65 is rotated by the transmission gear 13 and the first idle gear 71.

The sun gear 61 of the planetary gear train 60 is disposed in a second rotation shaft 21 of the second photosensitive medium 20. A second photosensitive medium driving gear 22 is disposed at one end of the second rotation shaft 21 of the second photosensitive medium 20 coaxially with the second photosensitive medium 20. The sun gear 61 of the planetary gear train 60 is coaxially disposed in the second rotation shaft 21 between the second photosensitive medium 20 and the second photosensitive medium driving gear 22. Accordingly, the second rotation shaft 21 of the second photosensitive medium 20 passes through the center portion of the planetary gear train 60. The second photosensitive medium driving gear 22 is located at one side of the planetary gear train 60, and the second photosensitive medium 20 is located at the other side of the planetary gear train 60, namely, at a side of the carrier 67. A pinion gear 52-2 of a second driving source 52 is matched with the second photosensitive medium driving gear 22. The second driving source 52 may be an electric motor. The pinion gear 52-2 is disposed in a shaft 52-1 of the second driving source 52. Therefore, when the shaft 52-1 of the second driving source 52 rotates, the second photosensitive medium driving gear 22 is rotated so that the second rotation shaft 21 is rotated. If the second rotation shaft 21 is rotated, the sun gear 61 and the second photosensitive medium 20 disposed in the second rotation shaft 21 are rotated.

The carrier 67 of the planetary gear train 60 transmits a rotational force to the third photosensitive medium 30. The third photosensitive medium 30 is disposed to rotate integrally with a third rotation shaft 31. A third photosensitive medium driving gear 32 is coaxially disposed at one end of the third rotation shaft 31. The third photosensitive medium driving gear 32 is connected to a gear 67-1 formed on the outer periphery of the carrier 67 of the planetary gear train 60 via a second idle gear 72. Accordingly, when the carrier 67 of the planetary gear train 60 is rotated, the third photosensitive medium driving gear 32 is rotated, and then, when the third photosensitive medium driving gear 32 is rotated, the third rotation shaft 31 is rotated. When the third rotation shaft 31 is rotated, the third photosensitive medium 30 is rotated. In an embodiment, the third photosensitive medium driving gear 32 and the carrier 67 of the planetary gear train 60 are connected to each other via the second idle gear 72. However, the connection method therebetween is not limited thereto. Alternatively, as long as the third photosensitive medium driving gear 32 is rotated in the same direction as the rotational direction of the carrier 67 of the planetary gear train 60, the third photosensitive medium driving gear 32 may be connected to the carrier 67 in a variety of ways.

A fourth photosensitive medium driving gear 42 is disposed at one end of a fourth rotation shaft 41 of the fourth photosensitive medium 40 coaxially with the fourth photosensitive medium 40. The fourth photosensitive medium driving gear 42 is matched with a pinion gear 53-2 of the third driving source 53. The third driving source 53 may be an electric motor. The pinion gear 53-2 is disposed in a shaft 53-1 of the third driving source 53. Therefore, when the shaft 53-1 of the third driving source 53 rotates, the fourth photosensitive medium driving gear 42 is rotated so that the fourth photosensitive medium 40 is rotated.

Figure 8:
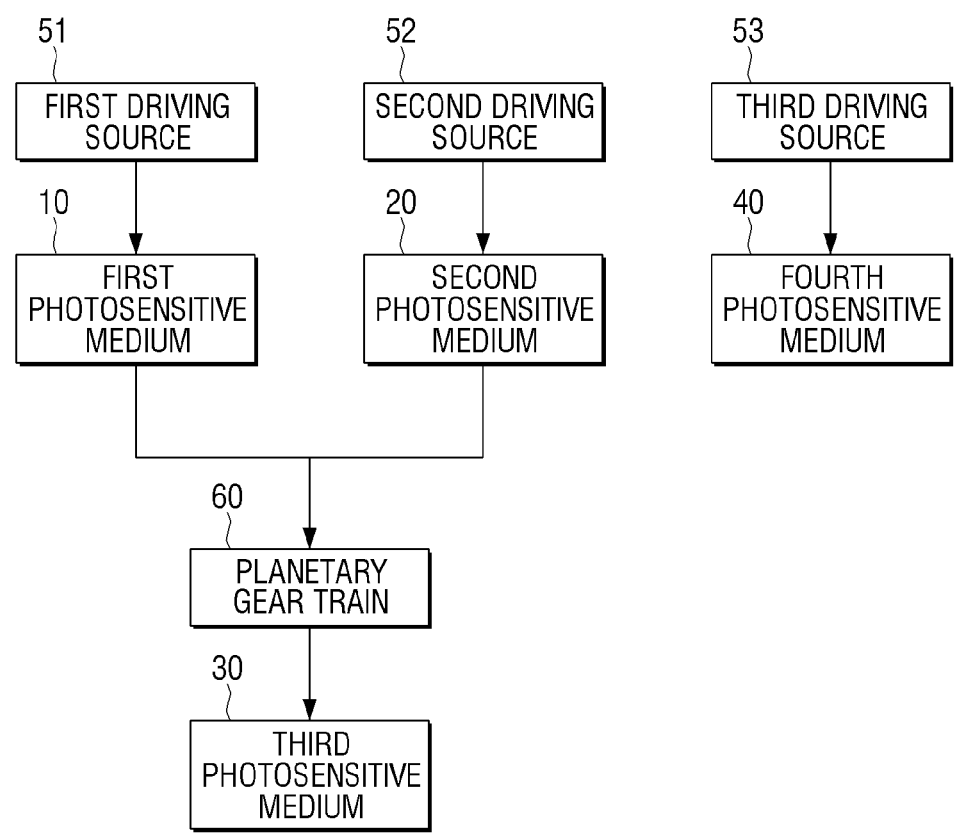
FIG. 8 is a block diagram illustrating power flow in a power transmitting structure of a photosensitive medium driving unit according to an embodiment.

The photosensitive medium driving unit 102 according to an embodiment having the structure as described above has a power flow as illustrated in FIG. 8. FIG. 8 is a block diagram illustrating a power flow in a power transmitting structure of the photosensitive medium driving unit 102 according to an embodiment.

Referring to FIG. 8, the power of the first driving source 51 is transmitted to the first photosensitive medium 10, and the power of the second driving source 52 is transmitted to the second photosensitive medium 20. Also, the powers of the first and second driving sources 51 and 52 are synthesized by the planetary gear train 60, and thus transmitted to the third photosensitive medium 30. The power of the third driving source 53 is transmitted to only the fourth photosensitive medium 40. In other words, the photosensitive medium driving unit 102 according to an embodiment rotates the four photosensitive media 10, 20, 30, and 40 using three driving sources 51, 52, and 53. At this time, the first, second, and fourth photosensitive media 10, 20, and 40 are directly driven by three driving sources 51, 52, and 53, namely, the first, second, and third driving sources, respectively, and the third photosensitive medium 30 is driven by the synthesized power of the first and second driving sources 51 and 52 through the planetary gear train 60.

Operation of the photosensitive medium driving unit 102 according to an embodiment will be described with reference to FIGS. 6 and 7.

If the first driving source 51 rotates, the first photosensitive medium driving gear 12 is rotated via the pinion gear 51-2. When the first photosensitive medium driving gear 12 is rotated, the first rotation shaft 11 is rotated so that the transmission gear 13 and the first photosensitive medium 10 are rotated integrally with the first rotation shaft 11. When the transmission gear 13 is rotated, the ring gear 65 of the planetary gear train 60 is rotated.

When the second driving source 52 rotates, the second photosensitive medium driving gear 22 is rotated through the pinion gear 52-2. When the second photosensitive medium driving gear 22 is rotated, the second rotation shaft 21 is rotated so that the sun gear 61 of the planetary gear train 60 and the second photosensitive medium 20 are rotated integrally with the second rotation shaft 21. When the sun gear 61 is rotated, the plurality of planetary gears 63 matched with the sun gear 61 is rotated. When the plurality of planetary gears 63 of the planetary gear train 60 is rotated, the carrier 67 is rotated.

When the carrier 67 of the planetary gear train 60 is rotated, the second idle gear 72 matched with the carrier 67 are rotated. When the second idle gear 72 is rotated, the third photosensitive medium driving gear 32 matched with the second idle gear 72 is rotated. When the third photosensitive medium driving gear 32 is rotated, the third photosensitive medium 30 coaxially disposed in the third rotation shaft 31 is rotated integrally by the third rotation shaft 31.

When the third driving source 53 rotates, the fourth photosensitive medium driving gear 42 is rotated through the pinion gear 53-2. When the fourth photosensitive medium driving gear 42 is rotated, the fourth rotation shaft 41 is rotated so that the fourth photosensitive medium 40 is rotated integrally with the fourth rotation shaft 41.

Accordingly, when the first, second, and third driving sources 51, 52, and 53 rotate, the first, second, third, and fourth photosensitive media 10, 20, 30, and 40 are rotated in the same direction. Therefore, a yellow color image, a cyan color image, a magenta color image, and a black color image formed on the surfaces of the first, second, third, and fourth photosensitive media 10, 20, 30, and 40 are sequentially transferred onto the intermediate transfer belt 110 so as to form a color image.

In an embodiment, because the ring gear 65 of the planetary gear train 60 is rotated by the rotational force of the first driving source 51 and the sun gear 61 of the planetary gear train 60 is rotated by the rotational force of the second driving source 52, a synthesized rotational force generated by synthesizing the rotational forces of the first driving source 51 and the second driving source 52 is output through the carrier 67 of the planetary gear train 60. Accordingly, a rotational speed of the carrier 67 of the planetary gear train 60 may be a value between the rotational speed of the sun gear 61 and the rotational speed of the ring gear 65.

Further, because the rotational speed of the ring gear 65 of the planetary gear train 60 is determined by the rotational speed of the first photosensitive medium 10 and the rotational speed of the sun gear 61 is determined by the rotational speed of the second photosensitive medium 20, it can be seen that the rotational speed of the carrier 67 is determined as a value between the rotational speed of the first photosensitive medium 10 and the rotational speed of the second photosensitive medium 20. Accordingly, the third photosensitive medium 30 rotated by the carrier 67 of the planetary gear train 60 is rotated at a rotational speed of a value between the rotational speed of the first photosensitive medium 10 and the rotational speed of the second photosensitive medium 20. As a result, even if a separate controller is not used as described above, the third photosensitive medium 30 is rotated at a rotational speed having a value between the rotational speed of the first photosensitive medium 10 and the rotational speed of the second photosensitive medium 20 so that the color registration in the first, second, and third photosensitive mediums 10, 20, and 30 can be improved. Further, because the fourth photosensitive medium 40 is separately driven by the third driving source 53, the fourth photosensitive medium 40 can be controlled to match the color registration of the first, second, and third photosensitive mediums 10, 20, and 30. Therefore, the color registration of an image forming apparatus 1 using the photosensitive medium driving unit 102 according to an embodiment can be improved.

A power transmitting structure of a photosensitive medium driving unit 103 according to an embodiment will be described with reference to FIGS. 9 and 10.

Figure 9:
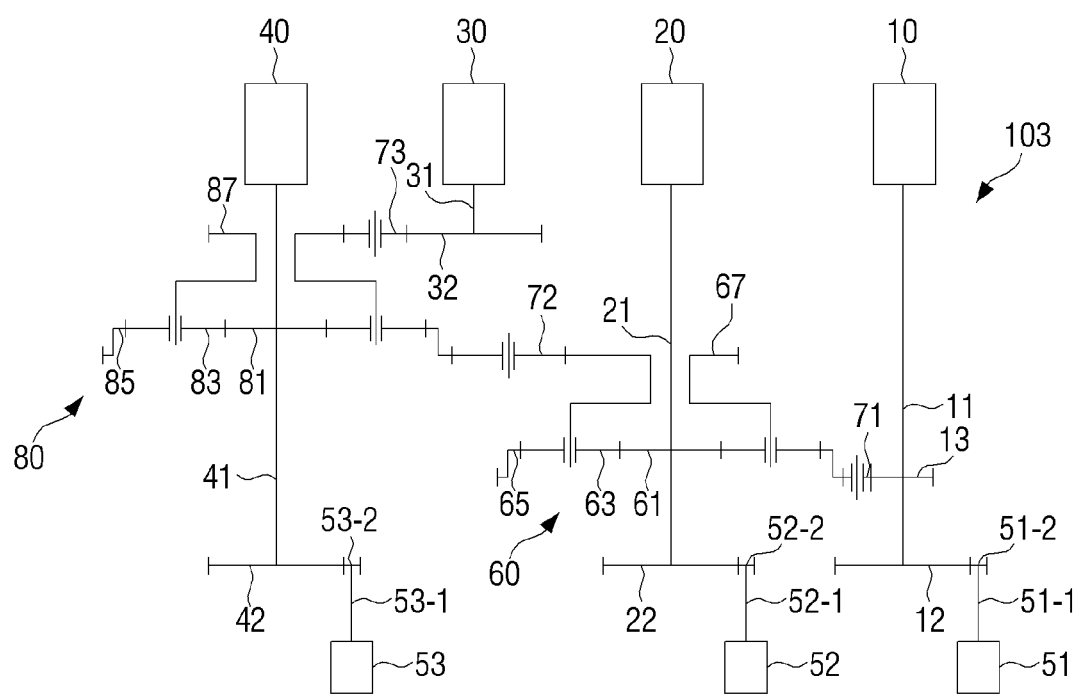
FIG. 9 is a conceptual view illustrating a power transmitting structure of a photosensitive medium driving unit according to a third embodiment usable in an image forming apparatus according to an embodiment.
Figure 10:
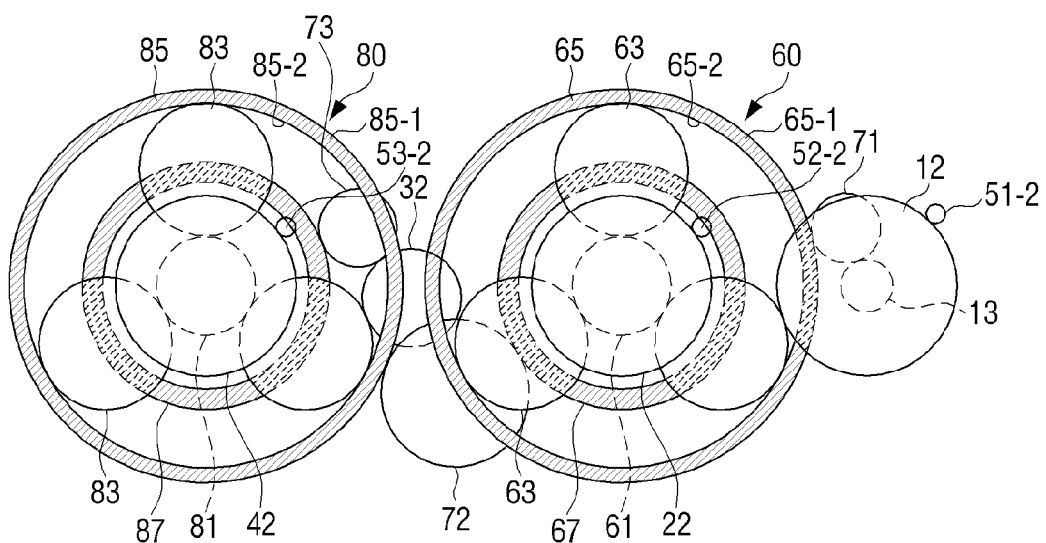
FIG. 10 is a view illustrating connection relationships of gears configuring the power transmitting structure of the photosensitive medium driving unit according to an embodiment of FIG. 9.

FIG. 9 is a conceptual view illustrating a power transmitting structure of a photosensitive medium driving unit according to an embodiment usable in an image forming apparatus according to an embodiment, and FIG. 10 is a view illustrating connection relationships of gears configuring the power transmitting structure of the photosensitive medium driving unit according to an embodiment of FIG. 9.

Referring to FIGS. 9 and 10, the photosensitive medium driving unit 103 according to an embodiment may include four photosensitive media 10, 20, 30, and 40, three driving sources 51, 52, and 53, and two planetary gear trains 60 and 80. For reference, in FIG. 9, the plurality of photosensitive media 10, 20, 30, and 40, the driving sources 51, 52, and 53, and the planetary gear trains 60 and 80 configuring the photosensitive medium driving unit 103 are conceptually illustrated for convenience of drawing. Also, in FIG. 10, gear teeth of each of the gears are not illustrated for the convenience of drawing.

The four photosensitive media 10, 20, 30, and 40, that is, a first photosensitive medium 10, a second photosensitive medium 20, a third photosensitive medium 30, and a fourth photosensitive medium 40 are rotatably supported by rotation shafts 11, 21, 31, and 41, respectively. Each of photosensitive medium driving gears 12, 22, 32, and 42 is coaxially disposed at one end of each of the rotation shafts 11, 21, 31, and 41. Accordingly, when the photosensitive medium driving gears 12, 22, 32, and 42 are rotated, the photosensitive media 10, 20, 30, and 40 are rotated integrally with the rotation shafts 11, 21, 31, and 41, respectively.

A first photosensitive medium driving gear 12 is disposed at one end of a first rotation shaft 11 of the first photosensitive medium 10 coaxially with the first photosensitive medium 10. A transmission gear 13 is coaxially disposed in the first rotation shaft 11 between the first photosensitive medium 10 and the first photosensitive medium driving gear 12. Accordingly, the first photosensitive medium driving gear 12 is matched with a pinion gear 51-2 of a first driving source 51. The first driving source 51 may be an electric motor. The pinion gear 51-2 is disposed in a shaft 51-1 of the first driving source 51. Therefore, when the shaft 51-1 of the first driving source 51 rotates, the first photosensitive medium driving gear 12 is rotated so that the first photosensitive medium 10 is rotated. At this time, the transmission gear 13 disposed in the first rotation shaft 11 transmits a rotational force to the first planetary gear train 60 through a first idle gear 71.

The two planetary gear trains 60 and 80, namely, first and second planetary gear trains 60 and 80 are configured to receive rotational forces from the two driving sources 51 and 52, and thus to output one rotational force. Each of the first and second planetary gear trains 60 and 80 may include a sun gear 61 and 81, a plurality of planetary gears 63 and 83, a ring gear 65 and 85, and a carrier 67 and 87. The first and second planetary gear trains 60 and 80 are the same as the planetary gear train 60 of the photosensitive medium driving unit 101 according to the first embodiment as described above; therefore, a detailed description thereof is omitted.

An outer gear 65-1 of the ring gear 65 of the first planetary gear train 60 is matched with the first idle gear 71. Also, the first idle gear 71 is matched with the transmission gear 13 of the first rotation shaft 11. Accordingly, when the first rotation shaft 11 is rotated by the first driving source 51, the ring gear 65 of the first planetary gear train 60 is rotated by the transmission gear 13 and the first idle gear 71.

The sun gear 61 of the first planetary gear train 60 is disposed in a second rotation shaft 21 of the second photosensitive medium 20. A second photosensitive medium driving gear 22 is disposed at one end of the second rotation shaft 21 of the second photosensitive medium 20 coaxially with the second photosensitive medium 20. The sun gear 61 of the first planetary gear train 60 is coaxially disposed in the second rotation shaft 21 between the second photosensitive medium 20 and the second photosensitive medium driving gear 22. Accordingly, the second rotation shaft 21 of the second photosensitive medium 20 passes through the center portion of the first planetary gear train 60. The second photosensitive medium driving gear 22 is located at one side of the first planetary gear train 60, and the second photosensitive medium 20 is located at the other side of the first planetary gear train 60, namely, at a side of the carrier 67 of the first planetary gear train 60. A pinion gear 52-2 of a second driving source 52 is matched with the second photosensitive medium driving gear 22. The second driving source 52 may be an electric motor. The pinion gear 52-2 is disposed in a shaft 52-1 of the second driving source 52. Therefore, when the shaft 52-1 of the second driving source 52 rotates, the second photosensitive medium driving gear 22 is rotated so that the second rotation shaft 21 is rotated. If the second rotation shaft 21 is rotated, the sun gear 61 of the first planetary gear train 60 and the second photosensitive medium 20 disposed in the second rotation shaft 21 are rotated.

The carrier 67 of the first planetary gear train 60 transmits a rotational force to the ring gear 85 of the second planetary gear train 80. The carrier 67 of the first planetary gear train 60 is matched with the second idle gear 72, and the second idle gear 72 is matched with an outer gear of the ring gear 85 of the second planetary gear train 80. Accordingly, when the carrier 67 of the first planetary gear train 60 is rotated, the ring gear 85 of the second planetary gear train 80 is rotated.

The sun gear 81 of the second planetary gear train 80 is disposed in a fourth rotation shaft 41 of the fourth photosensitive medium 40. A fourth photosensitive medium driving gear 42 is disposed at one end of the fourth rotation shaft 41 of the fourth photosensitive medium 40 coaxially with the fourth photosensitive medium 40. The sun gear 81 of the second planetary gear train 80 is coaxially disposed in the fourth rotation shaft 41 between the fourth photosensitive medium 40 and the fourth photosensitive medium driving gear 42. Accordingly, the fourth rotation shaft 41 of the fourth photosensitive medium 40 passes through the center portion of the second planetary gear train 80. The fourth photosensitive medium driving gear 42 is located at one side of the second planetary gear train 80, and the fourth photosensitive medium 40 is located at the other side of the second planetary gear train 80, namely, at a side of the carrier 87 of the second planetary gear train 80. A pinion gear 53-2 of a third driving source 53 is matched with the fourth photosensitive medium driving gear 42. The third driving source 53 may be an electric motor. The pinion gear 53-2 is disposed in a shaft 53-1 of the third driving source 53. Therefore, when the shaft 53-1 of the third driving source 53 rotates, the fourth photosensitive medium driving gear 42 is rotated so that the fourth rotation shaft 41 is rotated. If the fourth rotation shaft 41 is rotated, the sun gear 81 of the second planetary gear train 80 and the fourth photosensitive medium 40 disposed in the fourth rotation shaft 41 are rotated.

The third photosensitive medium 30 is disposed to rotate integrally with the third rotation shaft 31, and the third photosensitive medium driving gear 32 is disposed at one end of the third rotation shaft 31. The third photosensitive medium driving gear 32 is connected to a gear formed on the outer periphery of the carrier 87 of the second planetary gear train 80 through a third idle gear 73. Accordingly, when the carrier 87 of the second planetary gear train 80 is rotated, the third photosensitive medium driving gear 32 is rotated. When the third photosensitive medium driving gear 32 is rotated, the third rotation shaft 31 is rotated. When the third rotation shaft 31 is rotated, the third photosensitive medium 30 is rotated integrally with the third rotation shaft 31. In an embodiment, the third photosensitive medium driving gear 32 and the carrier 87 of the second planetary gear train 80 are connected to each other via the third idle gear 73. However, the connection method therebetween is not limited thereto. Alternatively, as long as the third photosensitive medium driving gear 32 is rotated in the same direction as the rotational direction of the carrier 87 of the second planetary gear train 80, the third photosensitive medium driving gear 32 may be connected to the carrier 87 of the second planetary gear train 80 in a variety of ways.

Figure 11:
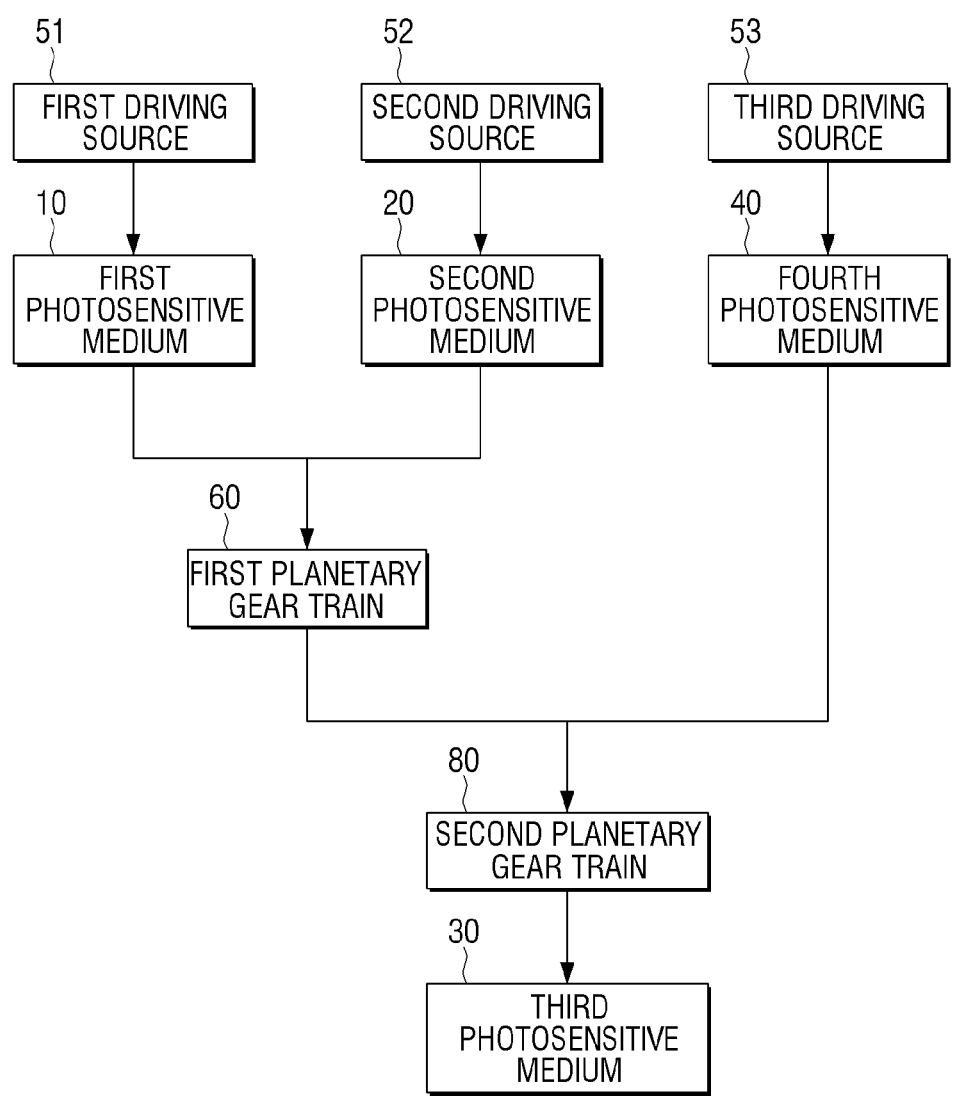
FIG. 11 is a block diagram illustrating power flow in a power transmitting structure of a photosensitive medium driving unit according to an embodiment.

The photosensitive medium driving unit 103 according to an embodiment having the structure as described above has a power flow as illustrated in FIG. 11. FIG. 11 is a block diagram illustrating a power flow in a power transmitting structure of the photosensitive medium driving unit 103 according to an embodiment.

Referring to FIG. 11, the power of the first driving source 51 is transmitted to the first photosensitive medium 10, and the power of the second driving source 52 is transmitted to the second photosensitive medium 20. Also, the powers of the first and second driving sources 51 and 52 are synthesized by the first planetary gear train 60, and thus transmitted to the second planetary gear train 80. The power of the third driving source 53 is transmitted to the fourth photosensitive medium 40. Also, the power of the third driving source 53 is transmitted to the second planetary gear train 80. Therefore, the powers of the first and second driving sources 51 and 52 synthesized by the first planetary gear train 60 are again synthesized with the power of the third driving source 53 by the second planetary gear train 80, and thus are transmitted to the third photosensitive medium 30. The photosensitive medium driving unit 103 according to an embodiment rotates four photosensitive media 10, 20, 30, and 40 using the three driving sources 51, 52, and 53. At this time, the first, second, and fourth photosensitive mediums 10, 20, and 40 are directly driven by the three driving sources 51, 52, and 53, namely, the first, second, and third driving sources 51, 52, and 53, respectively, and the third photosensitive medium 30 is driven by the synthesized power of the first, second, and third driving sources 51, 52, and 53 through the first and second planetary gear trains 60 and 80.

Operation of the photosensitive medium driving unit 103 according to an embodiment will be described with reference to FIGS. 9 and 10.

If the first driving source 51 rotates, the first photosensitive medium driving gear 12 is rotated via the pinion gear 51-2. When the first photosensitive medium driving gear 12 is rotated, the first rotation shaft 11 is rotated so that the transmission gear 13 and the first photosensitive medium 10 are rotated integrally with the first rotation shaft 11. When the transmission gear 13 is rotated, the ring gear 65 of the first planetary gear train 60 is rotated.

When the second driving source 52 rotates, the second photosensitive medium driving gear 22 is rotated through the pinion gear 52-2. When the second photosensitive medium driving gear 22 is rotated, the second rotation shaft 21 is rotated so that the sun gear 61 of the first planetary gear train 60 and the second photosensitive medium 20 are rotated integrally with the second rotation shaft 21. When the sun gear 61 and the ring gear 65 of the first planetary gear train 60 are rotated, the plurality of planetary gears 63 of the first planetary gear train 60 matched with the sun gear 61 is rotated. When the plurality of planetary gears 63 of the first planetary gear train 60 is rotated, the carrier 67 of the first planetary gear train 60 is rotated.

When the carrier 67 of the first planetary gear train 60 is rotated, the second idle gear 72 matched with the carrier 67 are rotated. When the second idle gear 72 is rotated, the ring gear 85 of the second planetary gear train 80 matched with the second idle gear 72 is rotated.

When the third driving source 53 rotates, the fourth photosensitive medium driving gear 42 is rotated through the pinion gear 53-2. When the fourth photosensitive medium driving gear 42 is rotated, the fourth rotation shaft 41 is rotated so that the sun gear 81 of the second planetary gear train 80 and the fourth photosensitive medium 40 is rotated integrally with the fourth rotation shaft 41. When the sun gear 81 of the second planetary gear train 80 is rotated, the plurality of planetary gears 83 of the second planetary gear train 80 matched with the sun gear 81 is rotated. When the plurality of planetary gears 83 is rotated, the carrier 87 of the second planetary gear train 80 is rotated.

When the carrier 67 of the second planetary gear train 60 is rotated, the third idle gear 73 matched with the carrier 67 is rotated. When the third idle gear 73 is rotated, the third photosensitive medium driving gear 32 matched with the third idle gear 73 is rotated. When the third photosensitive medium driving gear 32 is rotated, the third photosensitive medium 30 coaxially disposed in the third rotation shaft 31 is rotated integrally by the third rotation shaft 31.

Accordingly, when the first, second, and third driving sources 51, 52, and 53 rotate, the first, second, third, and fourth photosensitive media 10, 20, 30, and 40 are rotated in the same direction. Therefore, a yellow color image, a cyan color image, a magenta color image, and a black color image formed on the surfaces of the first, second, third, and fourth photosensitive media 10, 20, 30, and 40 are sequentially transferred onto the intermediate transfer belt 110 so as to form a color image.

In an embodiment, because the ring gear 65 of the first planetary gear train 60 is rotated by the rotational force of the first driving source 51 and the sun gear 61 of the first planetary gear train 60 is rotated by the rotational force of the second driving source 52, a synthesized rotational force generated by synthesizing the rotational forces of the first driving source 51 and the second driving source 52 is output through the carrier 67 of the first planetary gear train 60. Further, because the ring gear 85 of the second planetary gear train 80 is rotated by the carrier 67 of the first planetary gear train 60 and the sun gear 81 of the second planetary gear train 80 is rotated by the rotational force of the third driving source 53, a synthesized rotational force generated by synthesizing the rotational forces of the first, second, and third driving sources 51, 52, and 53 is output through the carrier 87 of the second planetary gear train 80. Accordingly, a rotational speed of the carrier 87 of the second planetary gear train 80 may be a value between the rotational speed of the sun gear 81 of the second planetary gear train 80 and the rotational speed of the ring gear 85 of the second planetary gear train 80.

Further, because the rotational speed of the ring gear 85 of the second planetary gear train 80 is determined by the rotational speeds of the first and second photosensitive media 10 and 20 and the rotational speed of the sun gear 81 of the second planetary gear train 60 is determined by the rotational speed of the fourth photosensitive medium 40, it can be seen that the rotational speed of the carrier 87 of the second planetary gear train 60 is determined as a value between a maximum rotational speed and a minimum rotational speed of the first, second, and fourth photosensitive media 10, 20, and 40. Accordingly, the third photosensitive medium 30 rotated by the carrier 87 of the second planetary gear train 80 is rotated at a rotational speed of a value between the maximum rotational speed and the minimum rotational speed of the first, second, and fourth photosensitive media 10, 20, and 40. As a result, even if a separate controller is not used as described above, the third photosensitive medium 30 is rotated at a rotational speed having a value between the maximum rotational speed and the minimum rotational speed of the first, second, and fourth photosensitive media 10, 20, and 40 so that the color registration in the first, second, third, and fourth photosensitive media 10, 20, 30, and 40 can be improved. Therefore, the color registration of an image forming apparatus 1 using the photosensitive medium driving unit 103 according to an embodiment can be improved.

The following comparative tests were performed to confirm that color registration is improved in an image forming apparatus 1 using a photosensitive medium driving unit 101 according to an embodiment.

In a first test case, position errors between colors were measured in a feeding direction of a print medium while performing a printing in an image forming apparatus using three photosensitive media to form magenta, cyan, and black color images. At this time, the three photosensitive media of the image forming apparatus are configured to be driven by a single driving source. A result of the first test case is shown in FIG. 12A.

In a second test case, a photosensitive medium driving unit 101 according to an embodiment is applied to the image forming apparatus used in the first test case, and computer simulations for position errors between colors while printing in the image forming apparatus are performed. At this time, because the image forming apparatus of the first test case uses only three photosensitive media, the fourth photosensitive medium 40 in the photosensitive medium driving unit 101 according to the first embodiment was excluded. Results of the computer simulation are shown in FIG. 12B.

Figure 12A:
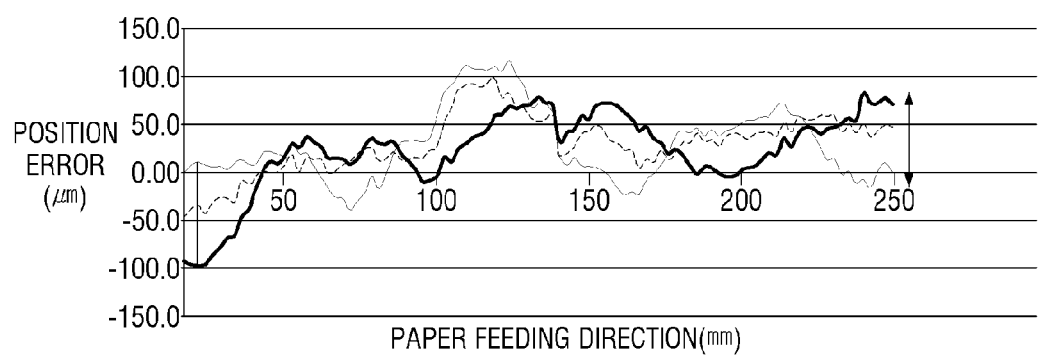
FIG. 12A is a graph illustrating color registrations of three photosensitive media measured in a conventional image forming apparatus.
Figure 12B:
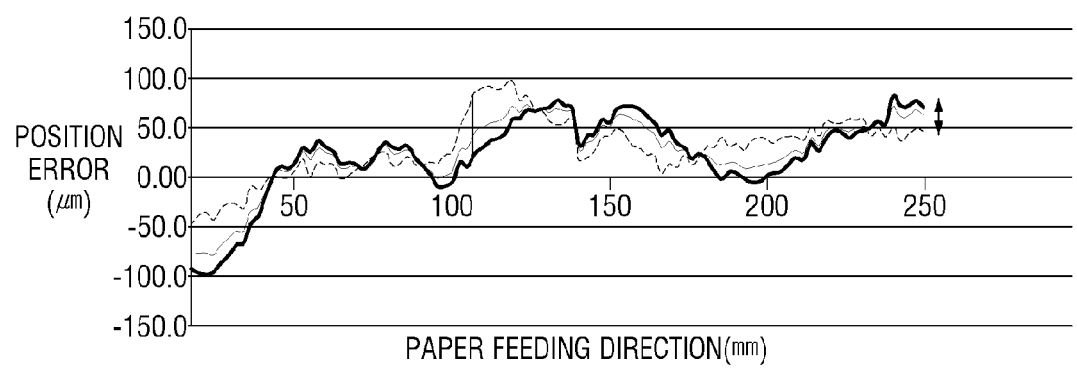
FIG. 12B is a graph illustrating color registrations of three photosensitive media measured in an image forming apparatus according to an embodiment.

In FIG. 12A, a maximum value of the position errors between colors is approximately 110 μm. In FIG. 12B, a maximum value of the position errors between colors is approximately 64 μm. Accordingly, it can be seen that the color registration of the image forming apparatus using the photosensitive medium driving unit according to an embodiment is improved than the conventional image forming apparatus.

As described above, the photosensitive medium driving unit according to an embodiment does not independently control each of the plurality of photosensitive media for colors, but mechanically controls at least one photosensitive medium for colors by using a planetary gear train and rotational forces of other two photosensitive media for colors. Accordingly, because a control portion for at least one photosensitive medium is removed, material cost can be reduced. Also, conventional techniques for controlling electrically each of the plurality of photosensitive media are vulnerable to electrical noise such as a sensor failure, etc. However, the photosensitive medium driving unit according to an embodiment is strong over electrical noise because it controls some of photosensitive media by a mechanical way.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. An image forming apparatus comprising:
first, second, third, and fourth photosensitive media;
a first driving source to rotate the first photosensitive medium;
a second driving source to rotate the second photosensitive medium; and
a planetary gear train to receive rotational forces of the first and second driving sources so as to rotate the third photosensitive medium,
wherein the fourth photosensitive medium is rotated by being linked with the third photosensitive medium, and
wherein powers of the first and second driving sources are synthesized by the planetary gear train, and are transmitted to the third photosensitive medium so that the third photosensitive medium is rotated.

2. The image forming apparatus of claim 1, wherein the planetary gear train comprises
a sun gear;
a plurality of planetary gears circumscribed to the sun gear and disposed to rotate along an outer periphery of the sun gear;
a ring gear supporting the plurality of planetary gears so that the plurality of planetary gears is inscribed to and rotated along an inner periphery of the ring gear; and
a carrier supporting the plurality of planetary gears, and the carrier is rotated on a same axis as those of the sun gear and the ring gear.

3. The image forming apparatus of claim 2, wherein the rotational force of the first driving source or the second driving source is input into the ring gear of the planetary gear train, the rotational force of the second driving source or the first driving source is input into the sun gear of the planetary gear train, and the third photosensitive medium is rotated by the carrier of the planetary gear train.

4. The image forming apparatus of claim 2, wherein each of the first, second, third, and fourth photosensitive media comprises each of first, second, third, and fourth rotation shaft supporting each of the first, second, third, and fourth photosensitive media, and each of first, second, third, and fourth photosensitive medium driving gears coaxially disposed in each of the first, second, third, and fourth rotation shafts.

5. The image forming apparatus of claim 4, wherein the first and second photosensitive medium driving gears receive power from the first and second driving sources, respectively.

6. The image forming apparatus of claim 4, wherein:
a transmission gear is disposed in the first rotation shaft of the first photosensitive medium coaxially with the first photosensitive medium driving gear, the transmission gear transmits power to the ring gear of the planetary gear train, and
the sun gear of the planetary gear train is disposed in the second rotation shaft of the second photosensitive medium coaxially with the second photosensitive medium driving gear.

7. The image forming apparatus of claim 6, wherein the third photosensitive medium driving gear of the third photosensitive medium receives power from the carrier of the planetary gear train.

8. The image forming apparatus of claim 7, wherein the fourth photosensitive medium driving gear of the fourth photosensitive medium receives power from the third photosensitive medium driving gear.

9. The image forming apparatus of claim 1, wherein the planetary gear train is formed of spur gears or helical gears.

10. An image forming apparatus comprising:
a plurality of photosensitive media; and
a planetary gear train to receive rotational forces of a first driving source and a second driving source so as to rotate one of the photosensitive mediums,
wherein at least one other photosensitive medium is rotated by being linked with the one of the photosensitive mediums, and
wherein powers of the first and second driving sources are synthesized by the planetary gear train, and are transmitted to the at least one other photosensitive medium so that the at least one other photosensitive medium is rotated.

11. The image forming apparatus of claim 10, wherein:
the planetary gear train comprises
a sun gear;

a plurality of planetary gears circumscribed to the sun gear and disposed to rotate along an outer periphery of the sun gear;

a ring gear supporting the plurality of planetary gears so that the plurality of planetary gears is inscribed to and rotated along an inner periphery of the ring gear; and a carrier supporting the plurality of planetary gears, and the carrier is rotated on a same axis as those of the sun gear and the ring gear.

12. The image forming apparatus of claim 11, wherein the rotational force of the first driving source or the second driving source is input into the ring gear of the planetary gear train, the rotational force of the second driving source or the first driving source is input into the sun gear of the planetary gear train, and the one of the photosensitive mediums is rotated by the carrier of the planetary gear train.

* * * * *